(12) United States Patent
Takakura et al.

(10) Patent No.: US 7,900,994 B2
(45) Date of Patent: Mar. 8, 2011

(54) PAD FOR ABSORBING IMPACT ON LEG PORTIONS AND FLOOR SPACER FOR VEHICLE

(75) Inventors: Shinji Takakura, Ibaraki (JP); Ayumi Hiraishi, Ibaraki (JP); Isao Suzuki, Saitama (JP)

(73) Assignee: Sekisui Plastics Co., Ltd., Osaka (JP)

( * ) Notice: Subject to any disclaimer, the term of this patent is extended or adjusted under 35 U.S.C. 154(b) by 129 days.

(21) Appl. No.: 12/226,675

(22) PCT Filed: Apr. 24, 2007

(86) PCT No.: PCT/JP2007/058778
§ 371 (c)(1),
(2), (4) Date: Oct. 24, 2008

(87) PCT Pub. No.: WO2007/125880
PCT Pub. Date: Nov. 8, 2007

(65) Prior Publication Data
US 2009/0174175 A1    Jul. 9, 2009

(30) Foreign Application Priority Data
Apr. 26, 2006    (JP) ................................ 2006-122003

(51) Int. Cl.
*B60N 3/04*    (2006.01)
*B60R 21/04*    (2006.01)

(52) U.S. Cl. .............. 296/187.05; 296/187.08; 296/39.1; 296/97.23; 280/751

(58) Field of Classification Search ............. 296/187.05, 296/187.08, 191, 39.1, 76, 97.23; 280/751; 428/95
See application file for complete search history.

(56) References Cited

U.S. PATENT DOCUMENTS

| | | | | |
|---|---|---|---|---|
| 2,709,105 A | * | 5/1955 | Kramer | ...................... 296/97.23 |
| 5,013,597 A | | 5/1991 | Kracke | |
| 5,876,826 A | * | 3/1999 | Hoffmann et al. | .............. 428/95 |
| 6,070,905 A | * | 6/2000 | Renault | ......................... 280/751 |

(Continued)

FOREIGN PATENT DOCUMENTS
DE    82 01 511.2 U1    7/1982
(Continued)

OTHER PUBLICATIONS

Extended European Search Report, App. No. 07742213.7-1254, Jan. 1, 2010 (3 pages).

(Continued)

*Primary Examiner* — Jason S Morrow
(74) *Attorney, Agent, or Firm* — Rader, Fishman & Grauer PLLC

(57) ABSTRACT

A pad for absorbing an impact on leg portions excellent in impact absorbing performance at a time of collision of a vehicle and the like, and a floor spacer for a vehicle are provided. A pad 1 for absorbing an impact on leg portions has a plurality of ridges 3, 3, ... on a bottom surface to be on a vehicle body side when placed in a vehicle, and is constituted of expandable beads. A floor spacer 10 is constituted of the pad 1 for absorbing an impact on leg portions and a horizontal pad 2. The ridge 3 has a wide portion 32 which becomes relatively wide from a midpoint in its longitudinal direction. The heel portions of the feet of an occupant are placed on the region of the wide portion 32.

2 Claims, 5 Drawing Sheets

U.S. PATENT DOCUMENTS 7,017,978 B2 * 3/2006 Murakami et al. ....... 296/187.05
2001/0021435 A1 9/2001 Milewski et al.

FOREIGN PATENT DOCUMENTS

| EP | 1 110 491 A1 | 6/2001 |
|---|---|---|
| GB | 1 523 211 A | 8/1978 |
| JP | 2003-294071 A | 10/2003 |
| JP | 2004-306791 A | 11/2004 |
| JP | 2004-360790 A | 12/2004 |
| JP | 2005-280560 A | 10/2005 |
| JP | 2006-088737 A | 4/2006 |

OTHER PUBLICATIONS

International Search Report mailed on May 22, 2007.

* cited by examiner

PAD FOR ABSORBING IMPACT ON LEG PORTIONS AND FLOOR SPACER FOR VEHICLE

TECHNICAL FIELD

The present invention relates to a pad for absorbing an impact on leg portions and a floor spacer for a vehicle which is constituted of the pad for absorbing an impact on leg portions and a horizontal pad, and particularly relates to a pad for absorbing an impact on leg portions and a floor spacer for a vehicle which are excellent in impact absorbing performance at a time of collision of the vehicle.

BACKGROUND ART

In order to protect the leg portions of an occupant from an impact at the time of collision of a vehicle or the like, on a floor on an inner side of a vehicle compartment, a pad for absorbing an impact on leg portions is generally placed under occupant foot portions in the front side of the floor, and a floor spacer for a vehicle constituted of the pad for absorbing an impact on leg portions and a horizontal pad which is placed on the floor behind it is generally placed.

For the above described pad for absorbing an impact on leg portions, various developments and improvements have been made so far from the viewpoint of enhancing its impact absorbing performance. One example of it includes the pad for absorbing an impact on leg portions which has been invented as a result of the earnest study by the applicants, (see Patent Document 1). The pad for absorbing an impact on leg portions is constituted of two regions that are an inclined portion and a horizontal portion, the two regions are divided by a ridge provided to extend in a width direction of a vehicle, and a plurality of longitudinally longer recessed grooves (ridges) which are provided to extend in the longitudinal direction of the vehicle are provided in both the inclined portion and the horizontal portion. Much energy can be absorbed in a short time by the recessed grooves being plastically deformed at the time of collision of the vehicle, and the impact load which acts on the leg portions of the occupant can be made less than the failure limit value.

Patent Document 1: JP Patent Publication (Kokai) No. 2004-306791

DISCLOSURE OF THE INVENTION

According to the pad for absorbing an impact on leg portions disclosed in Patent Document 1, much energy can be absorbed in a short time at the time of collision of a vehicle, and the impact load which acts on the leg portions of an occupant can be effectively relieved. A ridge which is provided to extend in the width direction of the vehicle is formed in the vicinity of a region where heel portions of the feet of the occupant to which the impact load is especially transmitted at the time of collision of the vehicle are generally placed, and deformation of a plurality of longitudinally long recessed grooves (ridges) which are provided to extend in the longitudinal direction of the vehicle is suppressed by the ridge, whereby the effect of the pad for absorbing an impact on the leg portions can be enhanced. However, it can readily be imagined that the positions where the heel portions are placed differ variously in a fixed space. Accordingly, the impact absorbing amount of the entire pad for absorbing an impact on leg portions needs to be enhanced so that the impact can be sufficiently absorbed even when the heel portions are not placed in the limited range.

A pad for absorbing an impact on leg portions and a floor spacer for a vehicle of the present invention are made in view of the above described problem, and has an object to provide a pad for absorbing an impact on leg portions and a floor spacer for a vehicle capable of setting the placing positions of the heel portions in a wide range and capable of effectively relieving the impact energy which is transmitted to the heel portions. Further, an object of a floor spacer for a vehicle of the present invention is to provide a floor spacer for a vehicle which can be effectively manufactured even when a pad for absorbing an impact on leg portions and a horizontal pad are integrally molded.

In order to attain the above described object, a pad for absorbing an impact on leg portions according to the present invention is a pad for absorbing an impact on leg portions having a plurality of ridges formed on a bottom surface to be on a vehicle body side when placed in a vehicle, and constituted of expandable beads, and characterized in that the aforesaid ridge has a portion which becomes relatively wide from a midpoint in a longitudinal direction of it.

The pad for absorbing an impact on leg portions is provided in order to prevent trouble to leg portions by absorbing an impact at the time of vehicle collision in addition to adjustment of the height of the floor surface under feet and flatness in an inclined plane. Here, a plurality of ridges (recessed grooves) are formed on the bottom surface to be on the vehicle body side when the pad for absorbing an impact on leg portions is placed in the vehicle. The ridge is constituted so that its width changes to be relatively wide from the midpoint in the longitudinal direction, and the wide portion is provided in the range (movable range of the heel portions) where the heel portions are assumed to be placed when the pad is actually placed in the vehicle.

In the pad for absorbing an impact on leg portions, the ridge provided to be extended in the width direction of the vehicle, which is provided in the conventional pad for absorbing an impact on leg portions which are already described is not formed, and only the ridges provided to extend in the longitudinal direction of the vehicle are formed on the undersurface of the pad.

Further, the expandable beads for molding the pad for absorbing an impact on leg portions is not especially limited, but when a thermoplastic resin particle is used as the expandable beads, a styrene-modified polyethylene resin, a polystyrene resin, a polyethylene resin, a polypropylene resin and the like can be used. Above all, a resin particle expanded molded article of a styrene-modified polyethylene resin obtained by impregnating a styrene monomer into a polyethylene resin particle and polymerizing the styrene monomer is especially preferable for the reasons that the resin particle expanded molded article of the styrene-modified polyethylene resin is excellent in size stability and shape retention as compared with an expanded molded article of a polyethylene resin particle and a foamed molding of a polypropylene resin particle, and powder due to abrasion hardly occurs as compared with an expanded molded article of a polystyrene resin particle. Further, the ratio of the styrene component in the styrene-modified polyethylene resin is 40 to 90 weight %, preferably 50 to 85 weight %, and more preferably 55 to 75 weight %.

On molding the pad for absorbing an impact on leg portions, the thermoplastic resin such as the above described styrene-modified polyethylene resin, for example, is impregnated with a blowing agent to prepare an expandable thermoplastic resin, and by pre-expanded the expandable thermoplastic resin with heating steam or the like, pre-expanded beads are produced. Next, the pre-expanded beads are filled in the molding die, and are foam-molded. In this case, as the expansion ratio of the floor spacer, molding is performed by the pre-expanded beads with the expansion ratio adjusted in the range of, for example, 3 to 70. The one with the expansion ratio of less than 3 becomes very hard, and therefore, sufficient plastic deformation performance by the foam cannot be expected. Meanwhile, when the expansion ratio exceeds 70, the foam is too soft, and it becomes difficult to obtain a reactive force as the foam.

According to the pad for absorbing an impact on leg portions of the present invention, the width of the ridge formed on the pad undersurface in the range where the heel portions are assumed to be placed is made relatively wide, whereby brittle fracture of the pad is prevented to exhibit the impact absorbing performance, and impact load which can be transmitted to the heel portions can be effectively reduced. Further, when a portion which becomes wide is provided in the ridge provided to extend in the longitudinal direction of the vehicle, the ridge area can be easily increased in correspondence with the movable range of the heels as compared with the case where the ridge provided to extend in the width direction of the vehicle is provided. Further, the manufacturing efficiency can be drastically increased as compared with the case where the intersecting ridges are manufactured.

A floor spacer for a vehicle according to the present invention is a floor spacer for a vehicle constituted of a horizontal pad of which top surface to be on an inner side of a compartment when placed in the vehicle is formed to be horizontal, a pad for absorbing an impact on leg portions in which a plurality of ridges are formed on a bottom surface to be on a vehicle body side when placed in the vehicle, characterized in that the pad for absorbing an impact on leg portions and the horizontal pad are molded from expandable beads, and the aforesaid ridge becomes relatively wide from a midpoint in a longitudinal direction of it to an end portion at a horizontal pad side.

The horizontal pad is provided to ensure adjustment of the height of the floor surface and flatness in the horizontal surface, and therefore, the top surface to be on the inner side of the compartment at the time of placement is generally formed to be horizontal. The horizontal pad can be also molded of the same raw material as the above described pad for absorbing an impact on leg portions, and the same molding method can be applied as the molding method.

For example, after both of them are separately molded, a fitting male portion is provided at one end portion, and a fitting female portion is provided at the other end portion. Subsequently, by fitting both of them, bonding both of them, or the like, the floor spacer for a vehicle can be formed.

The floor spacer for a vehicle of the present invention can prevent brittle fracture of the pad and allows it to exhibit the impact absorbing performance, and effectively reduce the impact load which can be transmitted to the heel portions by applying the pad for absorbing an impact on leg portions already described (pad in which a plurality of ridges are formed on the bottom surface to be on the vehicle body side when placed in the vehicle, and the ridge has a portion which becomes relatively wide from a midpoint in its longitudinal direction) for the pad for absorbing an impact on leg portions which is the constituent member.

Further, the impact absorbing pad and the horizontal pad can be molded from different kinds of raw materials. Here, the different kinds of raw materials mean the raw materials which are the pre-expanded beads of the same material, but differ in the respective expansion ratios, the raw materials differing in the materials themselves of the pre-expanded beads, and further, the raw materials having different materials of the pre-expanded beads and expansion ratios. For example, the pad for absorbing an impact on leg portions and the horizontal pad can be separately molded by selecting any one or two kinds or more of, for example, a styrene-modified polyethylene resin, a polystyrene resin, a polyethylene resin, a polypropylene resin and the like.

Impact resistance is required for the pad for absorbing an impact on leg portions. Therefore, by making the expansion ratio of the preliminarily foamed particle lower (densified) than the horizontal pad, the pad for absorbing an impact on leg portions can be molded in the mode as light as possible and including desired impact resistance, and the horizontal pad can be molded to be as light as possible. Therefore, the weight of the entire floor spacer can be made as light as possible while the impact resistance which is required for the pad for absorbing an impact on leg portions is ensured.

Further, another embodiment of the floor spacer for a vehicle according to the present invention is characterized in that the pad for absorbing an impact on leg portions and the horizontal pad are integrally molded.

The floor spacer for a vehicle of the present invention is the embodiment in which the pad for absorbing an impact on leg portions and the horizontal pad are integrally molded in one molding die. Here, the pad for absorbing an impact on leg portions is generally provided to extend at an optional angle corresponding to the shape of the vehicle body with respect to (the horizontal top surface of) the horizontal pad. When the ridge provided to extend in the longitudinal direction of the vehicle and the ridge provided to extend in the width direction of the vehicle are formed on the bottom surface of the pad for absorbing an impact on leg portions in such a mode, if the floor spacer is to be removed from the die after the floor spacer is molded in the molding die, the ridge provided to extend in the orthogonal direction is likely to interfere with the molding die and to be incapable of being removed from the die. More specifically, in the molding die constituted of the fixed die and the movable die, after the floor spacer is molded in the molding die, the floor spacer stuck to the movable die is removed from the fixed die by performing mold-opening of the movable die, and the floor spacer is removed from the movable die, whereby form removal of the floor spacer is performed. When mold-opening of the movable die is performed, the orthogonal ridge provided on the bottom surface of the floor spacer interferes with the recessed groove for forming the ridge provided in the cavity of the fixed die, and mold-opening of the movable die is inhibited.

Thus, the above described problem can be solved by adopting the embodiment in which only the ridges extending in the longitudinal direction of the vehicle are formed on the undersurface of the pad for absorbing an impact on leg portions, and each of the ridges has the portion which becomes wide in a part of it.

The ridge and the fixed die can be prevented from interfering with each other by forming at least the side surface at the vehicle rear side (horizontal pad side) out of the side surface defining the ridge of the pad for absorbing an impact on leg portions to be perpendicular or substantially perpendicular with respect to the top surface of the horizontal pad (the recessed grooves for forming the ridges of the fixed die become perpendicular or substantially perpendicular). "At least the side surface at the vehicle rear side" means that not only the side surface at the vehicle rear side but also the side surface at the vehicle front side, and the side surface extending in the longitudinal direction of the vehicle can be formed to be perpendicular or substantially perpendicular.

According to the floor spacer for a vehicle of the present invention, the floor spacer constituted of the pad for absorbing an impact on leg portions and the horizontal pad can be integrally manufactured from one molding die, and therefore, manufacture can be simplified. Further, both the pad for absorbing an impact on leg portions and the horizontal pad which are molded do not have to be connected to each other, and therefore, the floor spacer in the desired shape, namely, the floor spacer with high shape accuracy can be obtained.

Further, in the present embodiment, the impact absorbing pad and the horizontal pad can be integrally molded from different kinds of raw materials. For example, the pre-expanded beads for the horizontal pad and the pre-expanded beads for the pad for absorbing an impact on leg portions which differ in expansion ratio are respectively filled in one molding die and expansion molding. On this occasion, integral molding of the impact absorbing pad and the horizontal pad constituted of the different kinds of raw materials can be realized by the manufacturing method in which the inside of the cavity of the molding die is partitioned with the partitioning member, each of the pre-expanded beads are filled in the left and right spaces of the partitioning member at the same time, and the partitioning member is removed from the cavity after filling.

As can be understood from the above description, according to the pad for absorbing an impact on leg portions and the floor spacer for a vehicle of the present invention, the impact absorbing performance required for the pad for absorbing an impact on leg portions can be sufficiently ensured by only adopting the constitution in which the widths of the ridges in the range where the heel portions of an occupant are assumed to be placed out of a plurality of ridges provided on the undersurface of the pad for absorbing an impact on leg portions are made relatively wide.

NUMERALS IN THE DRAWINGS

1 . . . pad for absorbing an impact on leg portions, 2 . . . horizontal pad, 3 . . . ridge, 31 . . . ordinary portion, 32 . . . wide portion, 4 . . . recessed groove, 5 . . . movable die, 6 . . . fixed die, 61, 62 . . . filling port, 7 . . . partitioning member, 81, 82 . . . pre-expanded beads, 10 . . . floor spacer

BEST MODE FOR CARRYING OUT THE INVENTION

Figure 1:
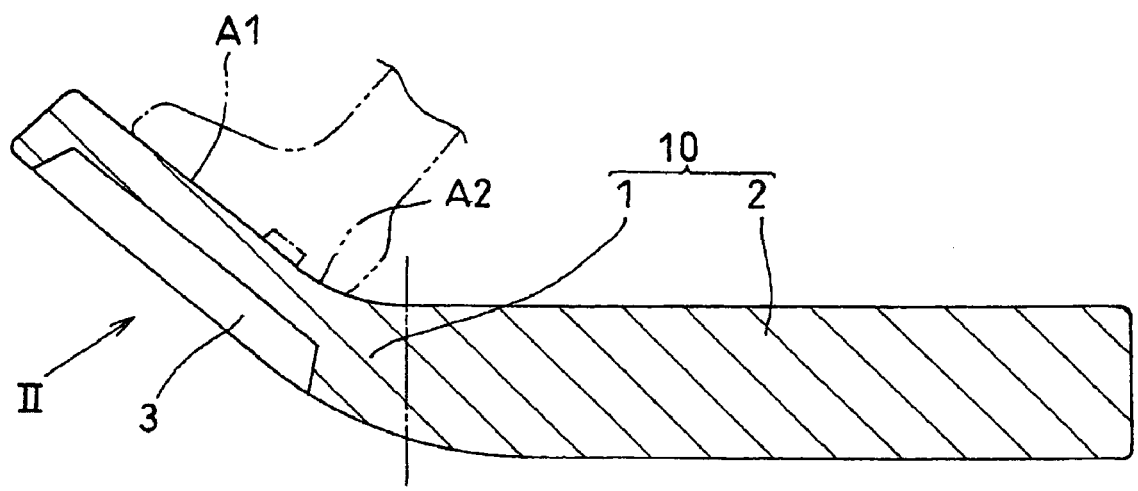
FIG. 1 is a sectional view of one embodiment of a floor spacer of the present invention.
Figure 2:
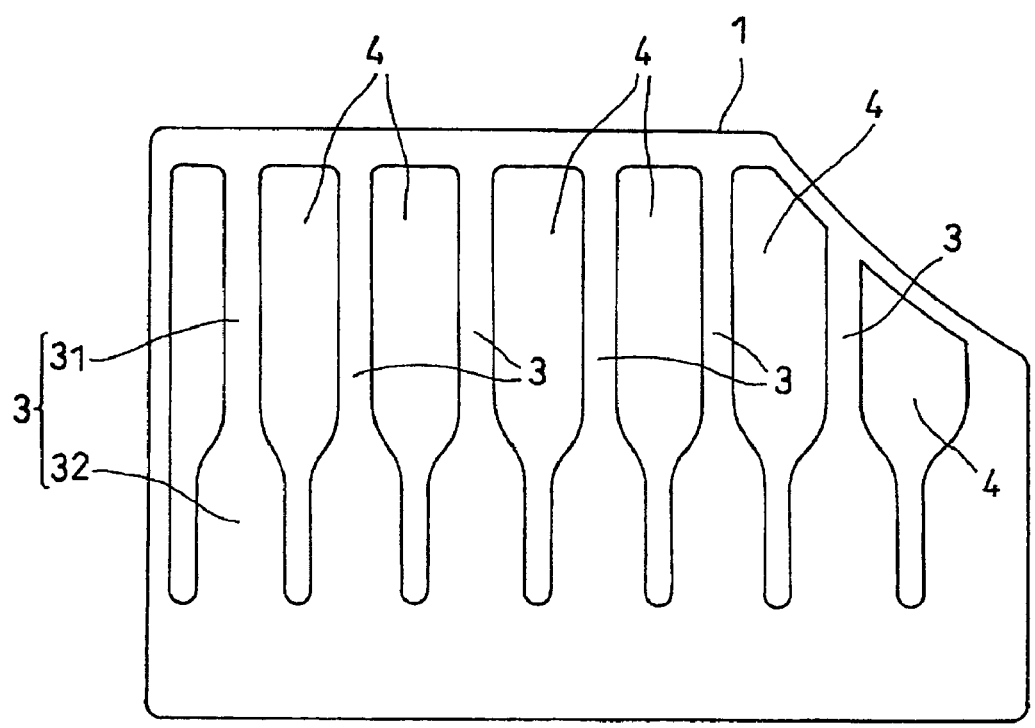
FIG. 2 is a view on arrow II in FIG. 1.
Figure 3:
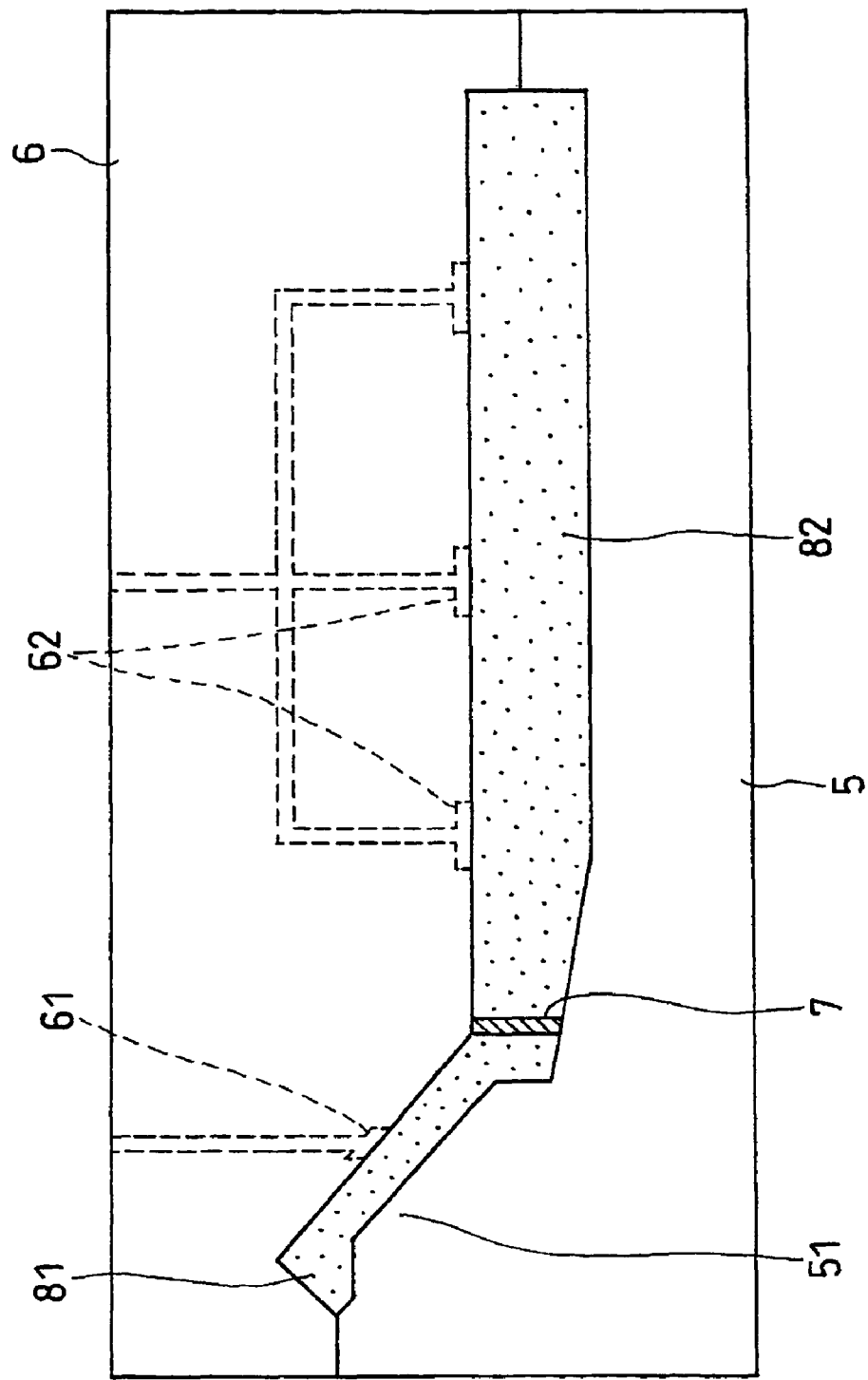
FIG. 3 is a view explaining a method for manufacturing the floor spacer.
Figure 4:
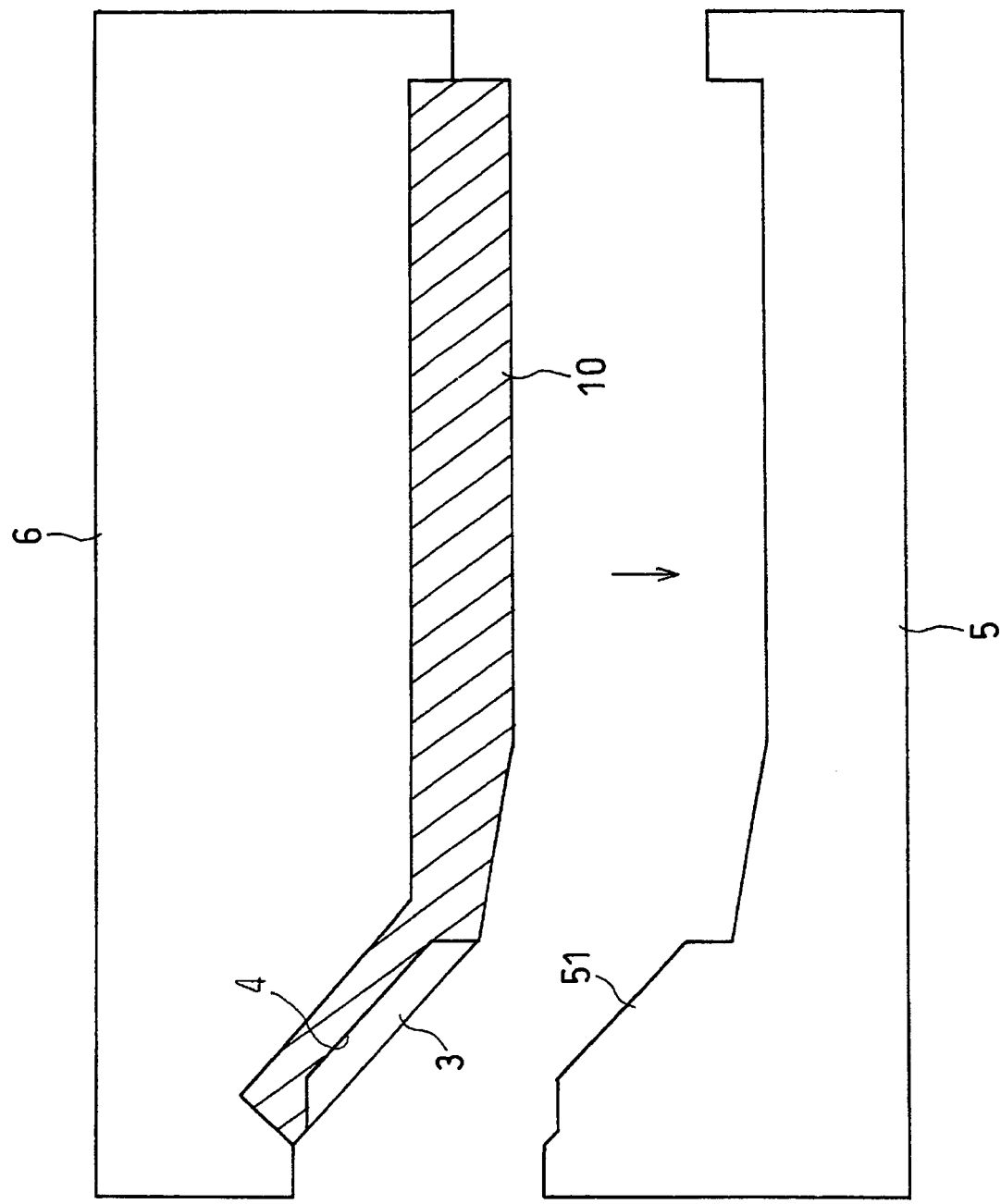
FIG. 4 is a view explaining the method for manufacturing the floor spacer, continuing from FIG. 3.
Figure 5:
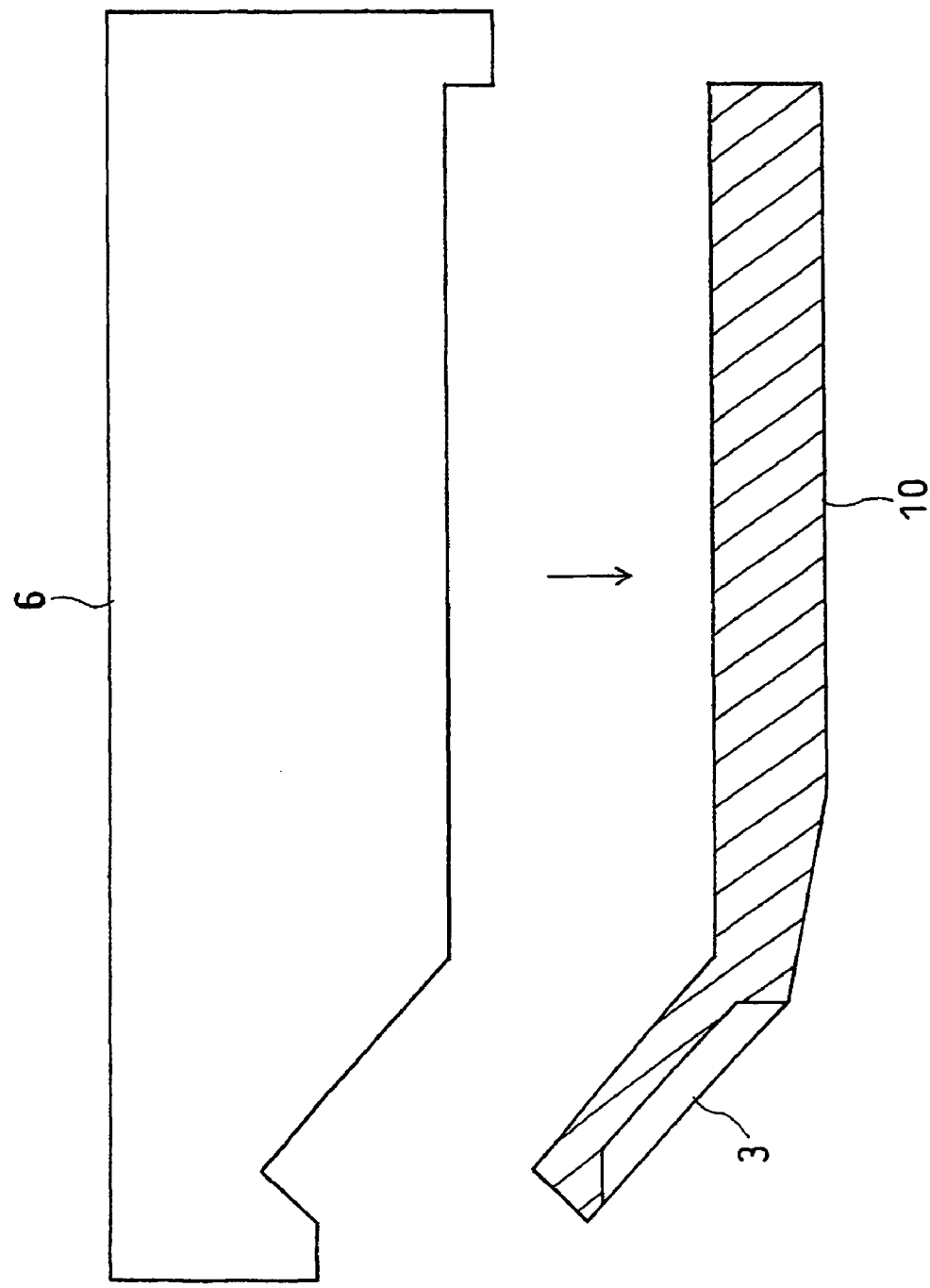
FIG. 5 is a view explaining the method for manufacturing the floor spacer, continuing from FIG. 4.
Figure 6:
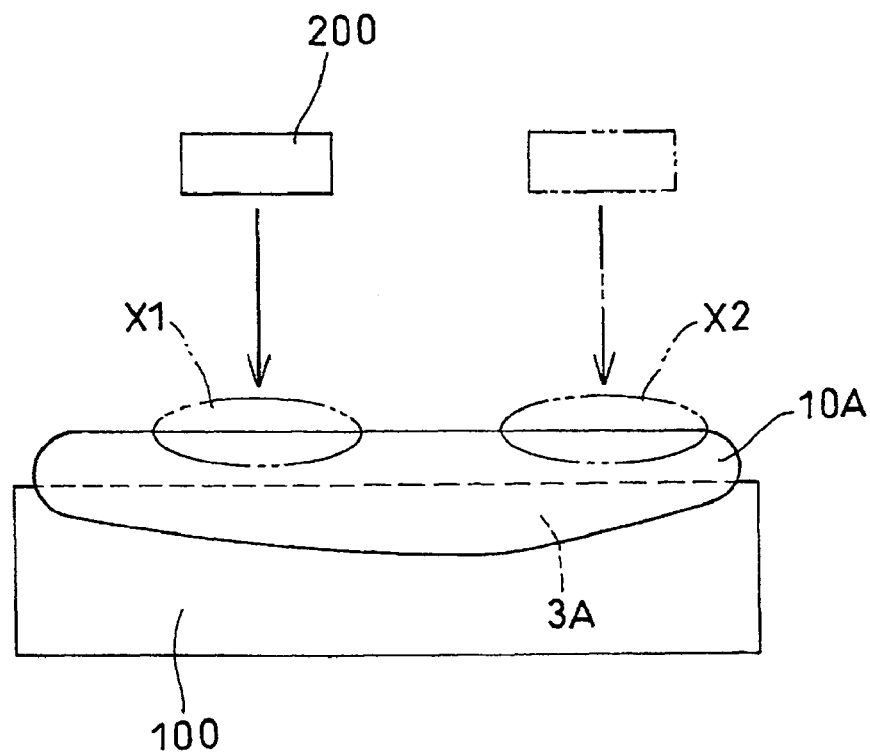
FIG. 6 is a view explaining an outline of a dynamic compression test method.
Figure 7:
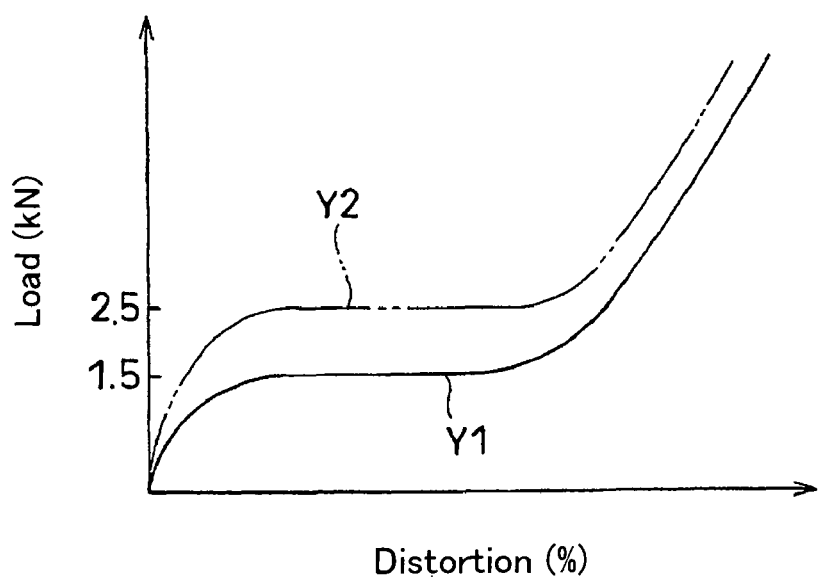
FIG. 7 is a graph showing a dynamic compression test method result.

Hereinafter, an embodiment of the present invention will be described with reference to the drawings. FIG. 1 shows a sectional view of one embodiment of a floor spacer of the present invention, and FIG. 2 shows a view on arrow II in FIG. 1. FIGS. 3 to 5 are views explaining a method for manufacturing the floor spacer in sequence. FIG. 6 shows a view explaining an outline of a dynamic compression test method, and FIG. 7 shows a graph showing the dynamic compression test result. The embodiment shown in the drawings is a floor spacer in which a pad for absorbing an impact on leg portions and a horizontal pad are integrally molded, but it goes without saying that the mode in which both of them are separately molded and assembled, and the embodiment including only the pad for absorbing an impact on leg portions having wide portions in the ridges may be adopted.

FIG. 1 shows a sectional view of one embodiment of the floor spacer. In a floor spacer 10, a pad 1 for absorbing an impact on leg portions which is placed at the foot portions of an occupant and a horizontal pad 2 which is placed on the floor in a vehicle compartment behind it are integrally molded (the left side of the chain line of FIG. 1 is the pad 1 for absorbing an impact on leg portions, and the right side is the horizontal pad 2). The top surface (surface on the inner side of the vehicle compartment) of the horizontal pad 2 is formed to be horizontal, and a plurality of ridges 3, 3, . . . which are provided to extend in the longitudinal direction of the vehicle are provided at the same spaces on the bottom surface (surface on the vehicle body side) of the pad 1 for absorbing an impact on leg portions. Further, the pad 1 for absorbing an impact on leg portions is formed in the posture inclined at a predetermined angle from the horizontal pad 2 in the form in accordance with the shape of the vehicle body side.

As shown in the view on arrow in FIG. 2, the ridge 3 is constituted of an ordinary portion 31 at the front side of the vehicle and a wide portion 32 which continues to the ordinary portion 31, is wider than the ordinary portion 31 and extends to the horizontal pad 2 side. The ridges 3, 3, . . . are placed at predetermined spaces, and the recessed grooves 4, 4, . . . are formed between them.

Returning to FIG. 1, of the foot portions of the occupant, a toe portion A1 is placed on the ordinary portion 31 of FIG. 2, and a heel portion A2 is placed on the wide portion 32. The wide portion 32 is provided in the range in which the heel portion A2 is assumed to be placed.

Next, the method for manufacturing the floor spacer 10 will be described with reference to FIGS. 3 to 5. Here, the pad 1 for absorbing an impact on leg portions and the horizontal pad 2 are preferably manufactured from different kinds of raw materials, and, for example, the method for integrally manufacturing both of them from the raw materials which are pre-expanded beads of the same material with their expansion ratios differing from each other, the method for manufacturing from the raw materials with the materials themselves of the pre-expanded beads differing from each other, and the method for manufacturing from the raw material with the materials of the pre-expanded beads and their expansion ratios differing from each other can be applied. Here, as the expandable beads for use, for example, a styrene-modified polyethylene resin, a polystyrene resin, a polyethylene resin, a polypropylene resin or the like, which is a thermoplastic resin, can be used.

The floor spacer 10 is in the mode in which the raw materials of the pad 1 for absorbing an impact on leg portions and the horizontal pad 2 differ from each other, and are integrally molded in one molding die. Here, as the molding die, an ordinary mold can be used, and the molding die is constituted of a fixed die 6 which is located at an upper side and a movable die 5 under the fixed die 6. A cavity corresponding to the shape of the floor spacer is formed on the opposed surfaces of both of them.

In the present embodiment, by using, for example, a styrene-modified polyethylene resin, the particle obtained by pre-expanded the pre-expanded beads for the pad for absorbing an impact on leg portions at a lower ratio as compared with the pre-expanded beads of the horizontal pad is filled into the cavity from peculiar filling ports 61 and 62. Here, a partition member 7 is provided in advance in the vicinity of the boundary of the pad for absorbing an impact on leg portions and the horizontal pad in the cavity so that both particles do not mix with each other, and the respective shapes are defined by the inner wall surface of the cavity and the partition member 7. In the movable die 5, a ridge 51 for forming a recessed groove is provided in a cavity surface forming the pad 1 for absorbing an impact on leg portions.

FIG. 3 shows the situation in which respective pre-expanded beads 81 and 82 are filled in the cavity, and the pre-expanded beads 81 and 82 of both of them are filled at the same time, and after they are filled, the partition member 7 is removed quickly from the inside of the cavity. For removal of the partition member 7, appropriate removing means for the partition member 7 may be provided in the vertical direction to the paper surface in the drawing.

FIG. 4 shows the situation in which after the pre-expanded beads 81 and 82 are foam-molded in the cavity, the movable die 5 moves in the die opening direction, whereby the floor spacer 10 is removed from the movable die 5 with the floor spacer 10 stuck to the cavity surface of the fixed die 6.

Here, the side surface at the vehicle rear side of the recessed groove 4 provided on the bottom surface of the pad 1 for absorbing an impact on leg portions is perpendicular to the horizontal top surface of the horizontal pad 2, and the side surface at the vehicle front side of the recessed groove 4 is preferably formed to be the surface which is opened to the vehicle front side from the orthogonal line with respect to the top surface of the horizontal pad 2. According to the above embodiment, die-opening of the movable die 5 is performed smoothly without the recessed groove 4 and the ridge 51 interfering with each other at the time of removal from the die. The side surface provided to extend in the vehicle longitudinal direction of the recessed groove 4 is preferably formed into the mode in which the side surface is orthogonal to the top surface of the horizontal pad 2, or its shape in sectional view widens toward the top end surface of the recessed groove from the bottom surface.

Finally, as shown in FIG. 5, by removing the floor spacer 10 from the fixed die 6, removal of the floor spacer 10 from the die is completed, and the floor spacer 10 which is constituted of the pad 1 for absorbing an impact on leg portions and the horizontal pad 2 and is in a desired shape is manufactured.

Since the ridge which is provided to extend in the width direction of the vehicle does not exist in the undersurface of the pad 1 for absorbing an impact on leg portions constituting the floor spacer 10, the manufacturing efficiency of it is dramatically increased in the above described manufacturing method. It goes without saying that the pad for absorbing an impact on the leg portions and the horizontal pad may be formed of the same material, and in this case, the inside of the cavity does not need to be partitioned with the partitioning member. The constitution of the molding die may be a constitution other than the illustrated mode.

[Compression Test and the Result]

FIG. 6 is a view showing an outline of the compression test for comparing the load-distortion characteristic of the pad for absorbing an impact on leg portions of the floor spacer of the present invention in its ordinary portion and wide portion. The compression test is an impact relieving effect confirmation experiment in accordance with the "dynamic compression test method for a packaging cushioning material" of JISZ0235. As shown in the drawing, a floor spacer 10A to be a test piece is prepared and fixed on a fixing jig 100, a compression board 200 (weight: 147 N (15 kgf)) is caused to drop to both the region where the toe is placed in the test piece (X1 region and the ordinary portion of the ridge) and the region where the heel portion is placed (X2 region and the wide portion of the ridge). In the ridge which is formed in the test piece, the width of the ordinary portion is 15 mm and the width of the wide portion is 25 mm. An accelerometer is mounted on the compression board 200, and a displacement gauge for measuring the displacement amount by dropping of the compression board 200 is mounted on the test piece. The load (kN) applied to the test piece and the displacement (mm) of the test piece with a lapse of time after the compression board 200 drops are obtained and distortion is calculated. The test piece is molded from the pre-expanded beads of a styrene resin, and the pre-expanded beads with their expansion ratio of 55 are used.

FIG. 7 shows the result of the experiment (load-distortion characteristics) in both the regions. In the drawing, Y1 represents the result in the X1 region of FIG. 6, and Y2 represents the result in the X2 region of FIG. 6, respectively. From the drawing, the load becomes 2.5 kN in the X2 region where the ridge becomes wide and the member rigidity becomes high, and the load becomes 1.5 kN in the X1 region where the rigidity is relatively low. Like this, the load of about 1.7 times as large as that on the toe portion acts on the heel portion, and the ridge to be formed needs to have the corresponding wide portion.

The embodiment of the present invention is described in detail above by using the drawings, but the concrete constitution is not limited to the embodiment, and design changes in the range without departing from the spirit of the present invention are included in the present invention.

The invention claimed is:

1. A pad for absorbing an impact on leg portions having a plurality of ridges formed on a bottom surface to be on a vehicle body side when placed in a vehicle, and constituted of expandable beads,
    wherein each ridge has an ordinary portion and a wide portion, said ordinary portion extending to a midpoint in a longitudinal direction of said ridge, and said wide portion being continuous with said ordinary portion, being wider than said ordinary portion, and extending from the midpoint in the longitudinal direction of said ridge.

2. A floor spacer for a vehicle comprising a horizontal pad of which top surface to be on an inner side of a compartment when placed in the vehicle is formed to be horizontal, a pad for absorbing an impact on leg portions in which a plurality of ridges are formed on a bottom surface to be on a vehicle body side when placed in the vehicle,
    wherein the pad for absorbing an impact on leg portions and the horizontal pad are molded from expandable beads, and each ridge has an ordinary portion and a wide portion, said ordinary portion extending to a midpoint in a longitudinal direction of said ridge, and said wide portion being continuous with said ordinary portion, being wider than said ordinary portion, and extending from the midpoint in the longitudinal direction of said ridge to an end portion at a horizontal pad side.

* * * * *